(12) United States Patent
Kim et al.

(10) Patent No.: US 10,921,249 B2
(45) Date of Patent: Feb. 16, 2021

(54) OPTICAL DIFFERENTIAL INTERROGATION METHOD AND APPARATUS FOR SURFACE PLASMON RESONANCE IMAGING

(71) Applicant: ELECTRONICS AND TELECOMMUNICATIONS RESEARCH INSTITUTE, Daejeon (KR)

(72) Inventors: Jong Deog Kim, Daejeon (KR); Yo Han Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/506,910

(22) Filed: Jul. 9, 2019

(65) Prior Publication Data
US 2020/0011790 A1 Jan. 9, 2020

(30) Foreign Application Priority Data
Jul. 9, 2018 (KR) .................. 10-2018-0079603

(51) Int. Cl.
*G01N 21/552* (2014.01)
(52) U.S. Cl.
CPC .................. *G01N 21/553* (2013.01)
(58) Field of Classification Search
CPC ............. G01N 21/648; G01N 21/6454; G01N 21/553; G01N 21/43; G01N 21/554;
(Continued)

(56) References Cited

U.S. PATENT DOCUMENTS 4,583,818 A 4/1986 Chen et al.
4,877,747 A 10/1989 Stewart
(Continued)

FOREIGN PATENT DOCUMENTS

KR 20080048907 A 6/2008
KR 20150101701 A 9/2015

OTHER PUBLICATIONS

Jongdeog Kim et al, Differential Angle Scanning Surface Plasmon Resonance Detection, 2018 IEEE, Bio-Medical IT convergence Research Division, SW Contents Research laboratory Electronics and Telecommunications Research Institute (ETRI), Daejeon Korea, 4 pages.
(Continued)

*Primary Examiner* — Hoa Q Pham (57) ABSTRACT

According to the present invention, an optical differential interrogation method for surface plasmon resonance imaging including: letting first incident light of a first wavelength and second incident light of a second wavelength to be incident on a sample while varying an incident angle; detecting intensity of first reflection light of the first incident light and intensity of second reflection light of the second incident light; and identifying the sample by using a difference between the intensity of the first reflection light and the intensity of the second reflection light, can be provided, and thus it is possible to obtain much better angular resolution while using a detector or a camera, which has a relative low receiving sensitivity and a sensor chip where samples having various characteristics are two-dimensionally arrayed and integrated can be effectively measured.

18 Claims, 8 Drawing Sheets

(58) Field of Classification Search
CPC ... G01N 2021/6419; G01N 2021/6421; G01N 2021/5903
USPC .............................. 356/445–448, 432–440
See application file for complete search history.

(56) References Cited

U.S. PATENT DOCUMENTS

| | | | |
|---|---|---|---|
| 6,807,323 | B2 | 10/2004 | Beom et al. |
| 7,576,863 | B2 | 8/2009 | Weibel |
| 8,384,905 | B2 | 2/2013 | Wu |
| 8,958,999 | B1* | 2/2015 | Ptasinski ............... G01N 21/554 702/66 |
| 2007/0081151 | A1* | 4/2007 | Shortt .................... G01N 21/47 356/237.2 |
| 2014/0066331 | A1 | 3/2014 | Choi et al. |
| 2015/0138536 | A1* | 5/2015 | Workman ................. G01J 3/06 356/51 |
| 2016/0154229 | A1* | 6/2016 | Milner ................... H04N 5/372 348/79 |

OTHER PUBLICATIONS

Ulrike Anders et al._SPRi-MALDI MS: characterization and identification of a kinase from cell lysate by specific interaction with different designed ankyrin repeat proteins, Dec. 16, 2016, pp. 1827-1836, Springer-Verlag Berlin Heidelberg.

Voula Kodoyianni, Label-free analysis of biomolecular interactions using SPR imaging, BioTechniques, 50:32-40, Jan. 2011, GWC Technologies Inc., Madison, WI, USA, 9 pages.

* cited by examiner

OPTICAL DIFFERENTIAL INTERROGATION METHOD AND APPARATUS FOR SURFACE PLASMON RESONANCE IMAGING

CROSS-REFERENCE TO RELATED APPLICATION

This application claims priority to and the benefit of Korean Patent Application No. 10-2018-0079603 filed in the Korean Intellectual Property Office on Jul. 9, 2018, the entire contents of which are incorporated herein by reference.

BACKGROUND OF THE INVENTION

(a) Field of the Invention

The present invention relates to an optical differential interrogation method for surface plasmon resonance imaging for analysis of a plurality of samples by using surface plasmon resonance (SPR), and an apparatus using the same.

(b) Description of the Related Art

Surface plasmon resonance (SPR) is a phenomenon in which, when a light-induced electromagnetic field is applied to an interface between a metal and a dielectric, a surface charge is induced on the interface due to discontinuity of the interface between the two media, and incoherent vibration occurs in an excited state in which the induced surface charges are collectively excited.

When P-polarized (or TM-polarized) light is incident on an interface between a metal and a dielectric media, an incident wave and an oscillating wave of a surface plasmon match each other in phase at a specific angle above a threshold angle at which total reflection occurs, and thus energy of light incident on the interface is absorbed, and accordingly, total reflection with respect to the incident light does not occur (i.e., surface plasmon resonance). Such a specific incident angle is called an SPR angle.

The above-described SPR phenomenon was experimentally clarified by studies of the Otto and Kretschmann-Raether groups in 1968.

Since then, in 1990, Biacore in Sweden launched the first SPR sensor equipment on the market, and various types of products (e.g., SPR sensors) using the SPR phenomenon have been marketed by several companies.

Such a product, particularly, the SPR sensor, can precisely and promptly measure a trace amounts of biomaterials in real time without labeling (non-marker).

However, for a single-channel or multi-channel SPR sensor, the number of samples that can be measured using the SPR sensor at one time is limited.

Accordingly, there is a growing need for SPR imaging (SPRI) technology that is capable of real-time label-free bio-sensing for SPR sensors (for example, a two-dimensional array biosensor for a large number of samples) for measuring a large number of samples at one time.

Conventional SPR sensing technologies using a general SPR biosensor are based on an optical method such as a phase detecting method, a method for analyzing by measuring reflection intensity through an optical prism, a wavelength interrogation method, and an angle interrogation method, and may include, for example, a wavelength interrogation method, a light intensity measurement method, or an analysis method that measures transmission intensity transmitted through an optical diffraction grating with camera image pixels.

The phase detecting method provides the best resolution, but it has a disadvantage that it requires a narrow dynamic range and a complex optical system configuration.

The method for analyzing by measuring reflection intensity through the optical prism provides a relatively good dynamic range of about 0.05 RIU while providing very easy image measurement realization, and thus has been most widely used in commercially available equipment. However, it has a drawback in resolution of about 10 RIU to about 5 RIU with respect to a refractive index compared to other optical means. In addition, the conventional reflection intensity measurement method acquires an angle-SPR characteristic curve at a fixed angle and measures reflection intensities in linear sections on the curve, and then compares the measured reflection intensities. However, it has a drawback of having a difficulty in measurement of various samples having wide dynamic ranges.

The angle interrogation method provides relatively good resolution with a wide dynamic range compared to other methods. As an example of the convention angle interrogation method, an angle-SPR curve of incident light (e.g., a case of having a constant spectrum width with respect to a center wavelength, e.g., an LED) having a single wavelength is measured, and an angle value that corresponds to a dip of the curve is acquired to analyze a characteristic of the corresponding sample. However, such a dip is weak to noise because it has detection intensity at the periphery of a minimum value, and forms an inflection point with a gentle slope over a relative wide angular region according to a refractive index of the prism and a wavelength of a light source. Accordingly, it has a drawback of requiring scanning at a finer angle for accurate measurement, which results in increased data throughput for an image.

SUMMARY OF THE INVENTION

The present invention has been made in an effort to provide an optical measuring and analyzing method and apparatus which complement the disadvantages of the conventional reflection intensity measuring method and angle measuring method, and has smaller data throughput and a wider dynamic range than conventional methods.

An optical differential interrogation method for surface plasmon resonance imaging according to an exemplary embodiment of the present invention includes: letting first incident light of a first wavelength and second incident light of a second wavelength to be incident on a sample while varying an incident angle; detecting intensity of first reflection light of the first incident light and intensity of second reflection light of the second incident light; and identifying the sample by using a difference between the intensity of the first reflection light and the intensity of the second reflection light.

The identifying of the sample by using the difference between the intensity of the first reflection light and the intensity of the second reflection light may include: detecting a first angle at which the difference between the intensity of the first reflection light and the intensity of the second reflection light becomes zero; and identifying a sample that corresponds to the first angle.

The identifying of the sample by using the difference between the intensity of the first reflection light and the intensity of the second reflection may include: detecting a second angle at which the difference between the intensity of the first reflection light and the intensity of the second reflection light is a positive number, and a third angle at which the difference between the intensity of the first reflection light and the intensity of the second reflection light is a negative number; and detecting the first angle based on the second angle and the third angle.

The identifying of the sample by using the difference between the intensity of the first reflection light and the intensity of the second reflection light may include: determining a magnitude of a difference between intensity of the first reflection light and intensity of the second reflection light at a fourth angle; and identifying the sample based on the magnitude of the difference between the intensity of the first reflection light and the intensity of the second reflection light at the fourth angle.

The optical differential interrogation method may include: when the magnitude of the difference between the intensity of the first reflection light and the intensity of the second reflection light at the fourth angle is less than a threshold value, determining a fifth angle that is distanced by as much as a predetermined first gap from the fourth angle; and when a difference between intensity of the first reflection light and intensity of the second reflection light that correspond to the fifth angle is zero, identifying a sample corresponding to the fifth angle.

The optical differential interrogation method may include: when the magnitude of the difference between the intensity of the first reflection light and the intensity of the second reflection light at the fourth angle is higher than the threshold and the difference between the intensity of the first reflection light and the intensity of the second reflection light at the fourth angle is a positive number, determining a sixth angle that is larger by a predetermined second gap than the fourth angle; and when a difference between intensity of the first reflection light and intensity of the second reflection light at the sixth angle is zero, identifying a sample corresponding to the sixth angle.

The optical differential interrogation method may include: when the magnitude of the difference between the intensity of the first reflection light and the intensity of the second reflection light at the fourth angle is higher than the threshold and the difference between the intensity of the first reflection light and the intensity of the second reflection light at the fourth angle is a negative number, determining a seventh angle that is smaller than the fourth angle by the predetermined second gap; and when a difference between intensity of the first reflection light and intensity of the second reflection light at the seventh angle is zero, identifying a sample corresponding to the seventh angle.

The first gap may be larger than the second gap.

The threshold value may correspond to a difference between the first incident light and the second incident light in a total reflection area with respect to the first incident light and the second incident light.

The optical differential interrogation method may include: differentiating intensity of the first reflection light and intensity of the second reflection light with respect to an angle; identifying an eighth angle and a ninth angle at which a value of the differentiation is a negative number; and detecting the first angle based on the eighth angle and the ninth angle.

An optical differential interrogation method for surface plasmon resonance imaging according to an exemplary embodiment of the present invention includes: letting a first incident light of a first wavelength and a second incident light of a second wavelength to be incident on a sample while varying an incident angle; detecting intensity of a first reflection light of the first incident light and intensity of a second reflection light of the second incident light; and identifying the sample by using a sum of the intensity of a first reflection light and the intensity of a second reflection light.

A gap between the first wavelength and the second wavelength may be larger than a first full width at half maximum of a wavelength range of the first incident light and a second full width at half maximum of a wavelength range of the second incident light.

The letting the first incident light of the first wavelength and the second incident light of the second wavelength to be incident on the sample while varying the incident angle may include letting the first incident light and the second incident light to be incident by using a wavelength tunable light source.

The letting the first incident light of the first wavelength and the second incident light of the second wavelength to be incident on the sample while varying the incident angle may include: coupling the first incident light and the second incident light from different light sources by using an optical fiber coupler; and letting the coupled first incident light and the second incident light to be incident on a sample through a single optical fiber.

The letting the first incident light of the first wavelength and the second incident light of the second wavelength to be incident on the sample while varying the incident angle may include letting the first incident light and the second incident light from different light sources to be overlapped with each other on the same path by using a multiple wavelength coupling filter.

In the detecting the intensity of the first reflection light of the first incident light and the intensity of the second reflection light of the second incident light, the first reflection light and the second reflection light may be branched by a wavelength distributor and thus may be detected by different detectors or different cameras.

The letting the first incident light of the first wavelength and the second incident light of the second wavelength to be incident on the sample while varying the incident angle may include letting the first incident light and the second incident light to be sequentially incident on the sample with a time difference corresponding to a detection speed of the detector or camera.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present invention, an interval between a first wavelength, which is a center wavelength of first incident light, and a second wavelength, which is a center wavelength of second incident light, is greater than the full width at half maximum (FWHM) of a wavelength range of the first wavelength or the second wavelength.

In the present invention, for example, the first incident light and the second incident light may be implemented by using a wavelength tunable light source, and the first incident light and the second incident light may be incident on a sample with a time difference, and in this case, the first incident light and the second incident light may be sequentially incident on the sample with a time difference at which a detector and/or a camera can synchronize with a measurable velocity. In another example, the first incident light and the second incident light are coupled from different light sources through an optical fiber coupler, and then may be incident on the sample through a single optical fiber. In another example, the first incident light and the second incident light may be implemented to be overlapped with each other on the sample on the same path by using a multiple wavelength coupling filter from different light sources. In another example, the first incident light and the second incident light are simultaneously incident on the sample, and a first reflection light according to the first incident light and a second reflection light according to the second incident light are branched by a wavelength distributor and thus may be measured by two detectors and/or two cameras.

The optical differential interrogation apparatus according to the present invention may detect the first reflection light and the second reflection light reflected according to the first incident light or the second incident light using a single detector, or may respectively measure a first image where the first reflection light is included and a second image where the second reflection light is included by using cameras.

According to the present invention, the optical differential interrogation apparatus for surface plasmon resonance imaging may acquire an SPR characteristic curve that indicates reflection intensity per angle by using each reflection light or each image detected by the single detector, and may carry out an analysis on a sample by using the SPR characteristic curve.

For example, an analysis with respect to a sample may include a process for identifying a sample.

Figure 1:
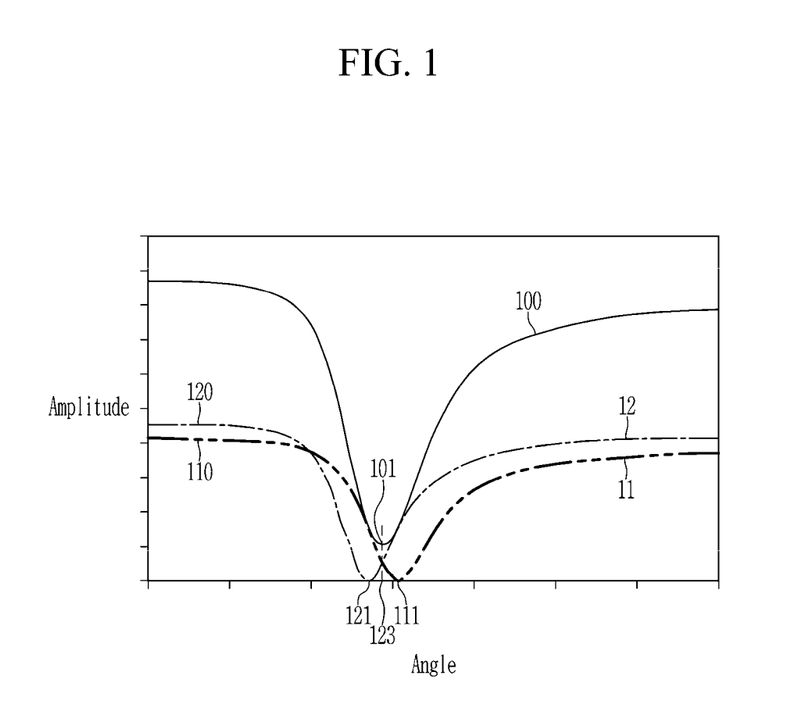
FIG. 1 is a graph that shows an SPR characteristic of an incident angle-reflection intensity with respect to two-wavelength incident light according to an exemplary embodiment of the present invention.

FIG. 1 is a graph that shows an SPR characteristic of incident angle-reflection intensity with respect to two-wavelength incident light according to an exemplary embodiment of the present invention.

As shown in FIG. 1, a first SPR curve 11 with respect to the first incident light and a second SPR curve 12 with respect to the second incident light for the same sample have different incident angle-reflection intensity shapes.

As shown in FIG. 1, the first SPR curve 11 may have the minimum value at a first angle 111 and a dip may be formed at the first angle 111, and the first angle 111 is defined as a first SPR angle 111. In addition, the second SPR curve 12 has the minimum value at a second angle 121 and a dip may be formed at the second angle 121, and the second angle 121 is defined as a second SPR angle 121.

Further, when intensity of the first incident light and intensity of the second incident light are different from each other, reflection intensities 110 and 120 which are respectively detected in angular regions where full reflection with respect to the first incident light and the second incident light are carried out with respect to the same sample may be different from each other.

As shown in FIG. 1, a third SPR curve 100, which is the sum of the first SPR curve 11 and the second SPR curve 12, may have a minimum value at a third angle 101, and the third angle 101 may be defined as a third SPR angle 101. In addition, an angle at which the first SPR curve 11 and the second SPR curve 12 cross each other may become the third SPR angle 101. Further, a dip 123 is formed at the periphery of the third SPR angle 101.

The optical differential interrogation apparatus for surface plasmon resonance imaging may analyze a characteristic of a measurement target sample by using the third SPR curve 100 and the third SPR angle 101 that corresponds to the dip 123.

In a conventional case, the first SPR angle 111 and the second SPR angle 121 are respectively measured when the first incident light of the first wavelength and the second incident light of the second wavelength have the minimum intensity of reflection light, and when the first SPR curve 11 or the second SPR curve 12 has small rate of change per incident angle (i.e., when a curve is gentle), the first SPR angle 111 and the second SPR angle 121 may be sensitive to measurement noise of the detector that detects the reflection light and/or the camera that acquires a reflection image.

However, unlike the conventional case, according to the present invention, because intensity of the reflection light of the first incident light of the first wavelength and intensity of the reflection light of the second incident light are larger than the minimum value of the third SPR curve 100, which is the sum of the first SPR curve 11 and the second SPR curve 12, the optical differential interrogation apparatus for surface plasmon resonance imaging according to the present invention is relatively robust with respect to a noise.

Figure 2:
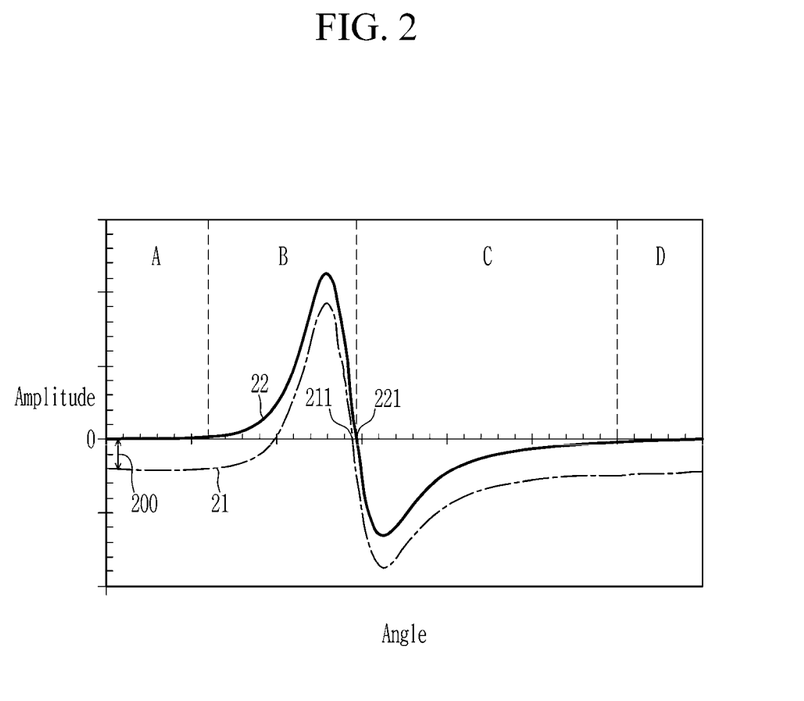
FIG. 2 is a graph that shows a characteristic of the incident angle-reflection intensity with respect to two-wavelength incident light according to the exemplary embodiment of the present invention.

FIG. 2 is a graph that shows a characteristic of an incident angle-reflection intensity difference of the two-wavelength incident light according to the exemplary embodiment of the present invention.

With respect to the same sample, a difference between reflection intensity with respect to the first incident light of the first wavelength and reflection intensity with respect to the second incident light of the second wavelength may be shown as a third SPR curve 21.

For example, reflection intensity of a total reflection region where surface plasmon resonance is not generated is determined by incident intensity of the first incident light or the second incident light, a characteristic of an optical system, and/or a characteristic of a gold thin film in the sensor regardless of the characteristic of the sample. Accordingly, an average 200 of differences between reflection intensity in a total reflection region according to the first incident light and reflection intensity of a total reflection region according to the second incident light among total reflection regions of the entire angular regions is constant, and the optical differential interrogation apparatus for the surface plasmon resonance imaging can measure with a unique constant value with respect to an individual sensor. The optical differential interrogation apparatus for the surface plasmon resonance imaging can acquire a compensated third SPR curve 22 by adding the unique constant value to the third SPR curve 21.

The optical differential interrogation apparatus for the surface plasmon resonance imaging can acquire a third angle 211 at which a reflection intensity difference becomes zero in the third SPR curve 21, and may carry out an analysis with respect to the measurement target sample by using a third angle 221 at which a reflection intensity difference becomes zero in the compensated third SPR curve 22.

In addition, as a means for determining a scanning angle range that is optimized for an unknown sample, the optical differential interrogation apparatus for the surface plasmon resonance imaging compares measurement results at random trial incident angles based on the respective angular ranges (i.e., A, B, C, and D in FIG. 2) in the characteristic graph that indicates the incident angle-reflection intensity difference to determine a scanning direction and range that highly possibly includes the third angle 221.

For example, the optical differential interrogation apparatus for the surface plasmon resonance imaging measures reflection intensity of the first reflection light according to the first incident light of the first wavelength and reflection intensity of the second reflection light according to the second incident light of the second wavelength to acquire a reflection intensity difference between the first reflection light and the second reflection light, acquires a characteristic value by adding a unique constant value to a difference between the acquired difference value and a pre-measured reflection intensity in a total reflection area, and determines in which region a currently measured incident angle is highly possibly included in a characteristic graph that shows an incident angle-reflection intensity difference based on a magnitude of the characteristic value.

For example, when an absolute value of a characteristic value acquired at a random incident angle is smaller than a threshold value Ith, the optical differential interrogation apparatus for the surface plasmon resonance imaging may determine that a current measurement incident angle is located in the region A or in the region D in FIG. 2. For example, when the absolute value of the characteristic value is larger than the threshold value Ith and the absolute value is a positive number, the optical differential interrogation apparatus for the surface plasmon resonance imaging may determine that a current measurement incident angle is located in the region B in FIG. 2. For example, when the absolute value of the characteristic value is larger than the threshold value Ith and the absolute value is a negative number, the optical differential interrogation apparatus for the surface plasmon resonance imaging may determine that a current measurement incident angle is located in the region C in FIG. 2.

When the random trial incident angle is determined to be included in the region A or in the region D, the optical differential interrogation apparatus for the surface plasmon resonance imaging repeats the measurement and the determination at another incident angle that is distanced by as much as a given angle until the trial incident angle is determined to be included in the region B or in the region C.

When the trial incident angle is determined to be included in the region B or in the region C, the optical differential interrogation apparatus for the surface plasmon resonance imaging determines an optimized scanning angle range that includes a start incident angle that is larger than a current angle and a large end incident angle, and iteratively measures incident angle-reflection intensity with respect to two wavelength incident lights at regular angular intervals from the start incident angle to the end incident angle to acquire a linear graph that includes that third angle 221 at which a reflection intensity difference becomes zero.

Figure 3:
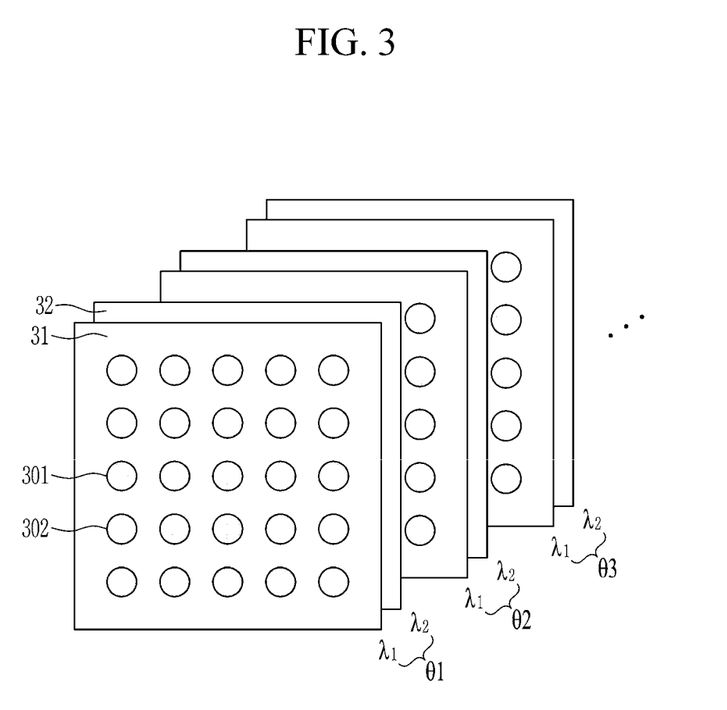
FIG. 3 shows two-dimensionally arrayed samples in a two-wavelength SPRI system according to the exemplary embodiment of the present invention.

FIG. 3 shows two-dimensional array samples in the two wavelengths SPRI system according to the exemplary embodiment of the present invention.

The optical differential interrogation apparatus for the surface plasmon resonance imaging may acquire an image measurement frame with respect to a biosensor chip where a plurality of samples including individual samples 301 and 302 are two-dimensionally arrayed by angle.

The optical differential interrogation apparatus for the surface plasmon resonance imaging may acquire an image 31 that includes reflection intensity of a sensor chip with respect to the first incident light of the first wavelength at a first angle, and may acquire a second image 32 that includes reflection intensity of a sensor chip with respect to the second incident light of the second wavelength at the first angle.

The optical differential interrogation apparatus for the surface plasmon resonance imaging iteratively performs such a process at sequential angles (i.e., a first angle, a second angle, a third angle, . . . ) to collect image data which enable angle interrogation and reflection intensity measurement, and carries out an analysis with respect to each of the plurality of samples by using the collected image data.

For example, the plurality of samples may be different from each other. In addition, the respective samples may imply a first sample in a state before the characteristic change and a second sample in a state after the characteristic change.

Figure 4:
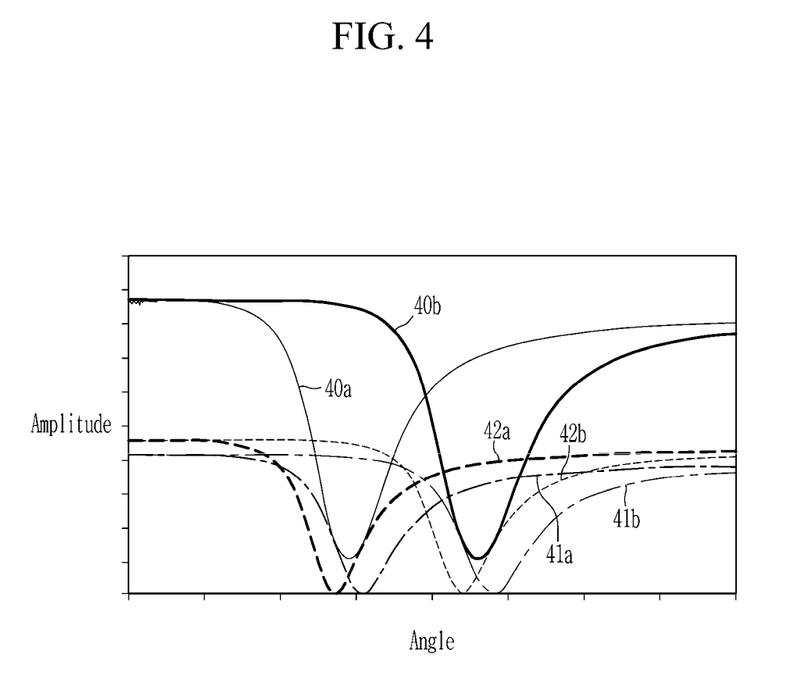
FIG. 4 is a graph that shows SPR characteristics of two-wavelength reflection intensity with respect to the first sample and the second sample according to the exemplary embodiment of the present invention.

FIG. 4 is a graph that shows SPR characteristics of two-wavelength reflection intensity with respect to the first sample and the second sample according to the exemplary embodiment of the present invention.

The optical differential interrogation apparatus for the surface plasmon resonance imaging may carry out an optical differential interrogation method for surface plasmon resonance imaging with respect to the plurality of samples 301 and 302 of FIG. 3.

The optical differential interrogation apparatus for the surface plasmon resonance imaging may acquire a first SPR curve 41a that indicates intensity of first reflection light according to first incident light of a first wavelength, which has been incident on a first sample, and a second SPR curve 41b that indicates intensity of second reflection light according to the first incident light of the first wavelength, which has been incident on a second sample.

The optical differential interrogation apparatus for the surface plasmon resonance imaging may acquire a third SPR curve 42a that indicates intensity of third reflection light according to second incident light of a second wavelength, which has been incident on the first sample, and a fourth SPR curve 42b that indicates intensity of fourth reflection light according to the second incident light of the second wavelength, which has been incident on the second sample.

The optical differential interrogation apparatus for the surface plasmon resonance imaging may acquire a fifth SPR curve 40a that is a sum of the first SPR curve 41a and the third SPR curve 42a, and a sixth SPR curve 40b that is a sum of the second SPR curve 41b and the fourth SPR curve 42b.

The optical differential interrogation apparatus for the surface plasmon resonance imaging may acquire a first SPR angle and a second SPR angle that correspond to a dip of the fifth SPR curve 40a and the sixth SPR curve 40b, that is, a minimum value on the fifth SPR curve 40a or the sixth SPR curve 40b, and may carry out an analysis with respect to the first sample and the second sample by using the first and second SPR angles.

Since the dip of the fifth SPR curve 40a or sixth SPR curve 40b is measured under a condition of reflection intensity that is relatively robust with respect to a noise compared to the first SPR curve to the fourth SPR curve, measurement can be stably carried out even when variation of the surface plasmon reflection intensity with respect to an incident angle is gentle and the intensity is weak.

Figure 5:
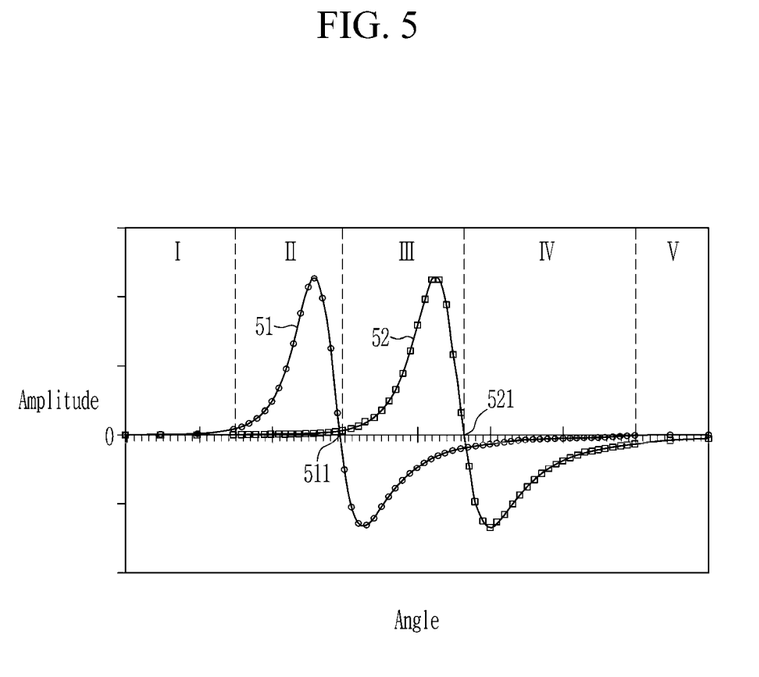
FIG. 5 is a graph that shows an angle interrogation characteristic based on two-wavelengths SPRI according to the exemplary embodiment of the present invention.

FIG. 5 is a graph that shows an angle interrogation characteristic based on two-wavelengths SPRI according to the exemplary embodiment of the present invention.

The optical differential interrogation apparatus for the surface plasmon resonance imaging may carry out the optical differential interrogation method for surface plasmon resonance imaging with respect to the first sample and the second sample, each having a different position and a different characteristic on the two-dimensional array.

The optical differential interrogation apparatus for the surface plasmon resonance imaging firstly carries out preliminary scanning with respect to the incident angle of the entire area at a sparse angular interval such as the point data shown in the section I or V, which is the total reflection section, for efficient measurement, for the same reason as previously described with reference to FIG. 2.

The optical differential interrogation apparatus for the surface plasmon resonance imaging may acquire a first SPR curve 51, which is acquired by compensating a difference value of different intensities acquired through different incident lines of different wavelengths for the first sample with a difference value in the total reflection region. The optical differential interrogation apparatus for the surface plasmon resonance imaging may acquire a second SPR curve 52, which is acquired by compensating a difference value of different intensities acquired through different incident lines of different wavelengths for the second sample with a difference value in the total reflection region.

The optical differential interrogation apparatus for the surface plasmon resonance imaging may acquire the first SPR curve 51 and the second SPR curve 52 based on scanning which is preliminarily carried out with respect to the first sample and the second sample on the two-dimensional array.

For example, when an absolute value of a characteristic value (i.e., a value acquired by adding a unique constant value to a reflection intensity value) in each of the first SPR curve 51 and the second SPR curve 52 is smaller than the threshold value Ith, the optical differential interrogation apparatus for the surface plasmon resonance imaging determines that the incident angel is located in the section I or the section V and carries out additional scanning to acquire a third SPR angle 511 or a fourth SPR angle 521 at which the characteristic value becomes zero.

As another example, when an absolute value of a characteristic value (i.e., a value acquired by adding a unique constant value to a reflection intensity value) in each of the first SPR curve 51 and the second SPR curve 52 is larger than the threshold value Ith and the characteristic value has a positive value, the optical differential interrogation apparatus for the surface plasmon resonance imaging determines the incident angle is located in the section II and carries out additional scanning to acquire the third SPR angle 511 or the fourth SPR angle 521 at which the characteristic value becomes zero.

As another example, when an absolute value of a characteristic value (i.e., a value acquired by adding a unique constant value to a reflection intensity value) in each of the first SPR curve 51 and the second SPR curve 52 are larger than the threshold value Ith and the characteristic value has a negative value, the optical differential interrogation apparatus for the surface plasmon resonance imaging determines that incident angle is located in the section III and carries out additional scanning to acquire the third SPR angle 511 or the fourth SPR angle 521 at which the characteristic value becomes zero.

In another example, the optical differential interrogation apparatus for the surface plasmon resonance imaging acquires differential values of the first SPR curve 51 and the second SPR curve 52, determines two angles at which the smallest absolute value of the characteristic value among angles in which each differential value has a negative region, detects a final angle at which the characteristic value becomes zero in a straight line between two points of the first SPR curve 51 or the second SPR curve 52, respectively corresponding to the two angles, and carries out an analysis with respect to a sample based on the final angle.

Meanwhile, as stated above, fine angle scanning in the angle interrogation method results in generation of a large amount of image data. Thus, this is economically inefficient because not only does the time required for measurement and signal processing increase, but it also requires more high-performance hardware/software. In addition, the reflection intensity measurement method at a fixed angle has a drawback of having a limited searchable range as compared with the angle interrogation method.

In order to solve such a problem, another exemplary embodiment of the present invention will be described with reference to FIG. 6 and FIG. 7.

Figure 6:
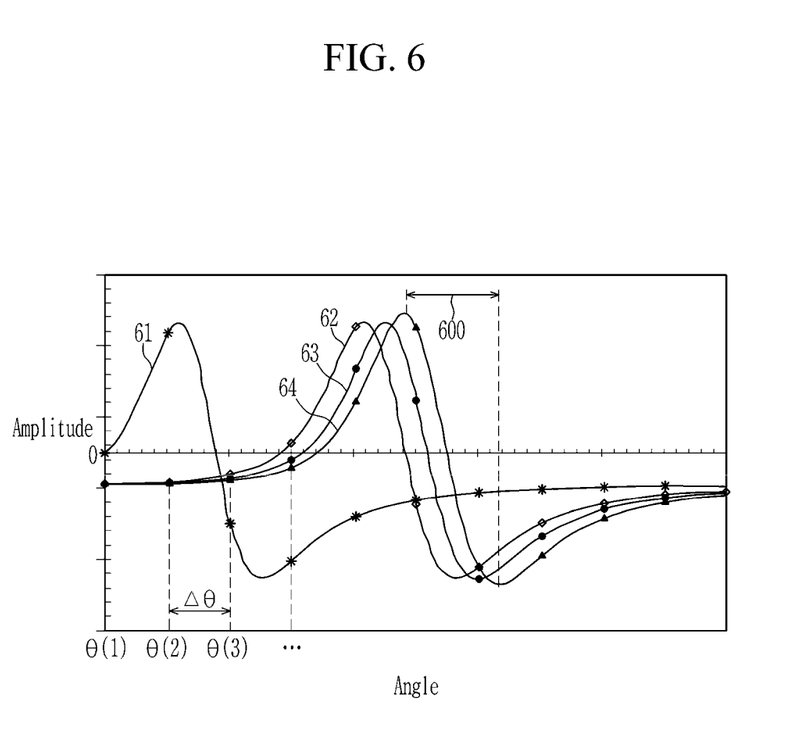
FIG. 6 is a graph that shows an SPR characteristic acquired by measuring angle scanning reflection intensity based on two-wavelength SPRI according to an exemplary embodiment of the present invention.

FIG. 6 is a graph that shows an SPR characteristic acquired by measuring angle scanning reflection intensity based on two-wavelength SPRI according to an exemplary embodiment of the present invention.

An optical differential interrogation apparatus for the surface plasmon resonance imaging may acquire a plurality of first characteristic values by applying the unique constant value, which has been described with reference to the previous drawings, to reflection intensity of reflection light acquired by different incident light of different wavelengths with respect to a plurality of two-dimensionally arrayed samples (61, 62, 63, 64) at a first angle $\theta$ (1).

The optical differential interrogation apparatus for the surface plasmon resonance imaging may acquire a plurality of second characteristic values with respect to the plurality of two-dimensionally arrayed samples (61, 62, 63, 64) at a second angle $\theta$ (2), which has been increased (or decreased) by as much as a predetermined angle gap $\Delta\theta$.

The optical differential interrogation apparatus for the surface plasmon resonance imaging may acquire a plurality of third characteristic values with respect to the plurality of two-dimensionally arrayed samples (61, 62, 63, 64) at a third angle θ (3), which has been increased (or decreased) by as much as the predetermined angle gap Δθ.

For example, the angle gap Δθ may be predetermined as a value that is smaller than a distance 600 between a ridge and a dip of a single SPR curve.

The optical differential interrogation apparatus for the surface plasmon resonance imaging may generate an initial list L(N) together with an identification number with respect to each of the plurality of samples (61, 62, 63, 64) on the two-dimensional array.

The optical differential interrogation apparatus for the surface plasmon resonance imaging calculates variation of a characteristic value between the first angle θ (1) and the second angle θ (2) with respect to the plurality of samples (61, 62, 63, 64), that is, a variation value ΔI between a first characteristic value and a second characteristic value, and identifies at least one first sample of which an absolute value of the variation value ΔI between the first characteristic value and the second characteristic value is larger than the threshold value Ith and a slope ΔI/Δθ between the first characteristic value and the second characteristic value is a negative number.

The optical differential interrogation apparatus for the surface plasmon resonance imaging identifies at least one second sample of which variation of a characteristic value between the second angle θ (2) and a third angle θ (3), that is, a slope ΔI/Δθ between the second characteristic value and a third characteristic value, is a positive number with respect to the at least one identified sample, generates a list L(1) for characteristic values of the respective second samples according to size of number, and carries out an analysis with respect to the second samples based on the list L(1).

Next, the optical differential interrogation apparatus for the surface plasmon resonance imaging calculates a fourth angle θ (4) that is increased (or decreased) by the predetermined angle gap Δθ, identifies fourth samples of which an absolute value of the variation value ΔI of the characteristic value between the second angle θ (2) and the third angle θ (3) is larger than the threshold value Ith and a slope ΔI/Δθ is a negative number with respect to third samples while excluding second samples included in L(1) in the list L(N), and generates a list L(2) for characteristic values of fifth samples of which a slope ΔI/Δθ with respect to characteristic value variation between the third angle θ (3) and the fourth angle θ (4) is a positive number among the fourth samples and then carries out an analysis with respect to the fifth samples based on the list L(2).

The optical differential interrogation apparatus for the surface plasmon resonance imaging continuously generates a plurality of lists L(3), L(4), . . . with respect to consecutive angles that are increased (or decreased) by the angle gap Δθ by using the same method as described above, and carries out an analysis with respect to the other samples.

The optical differential interrogation apparatus for the surface plasmon resonance imaging stops measurement when all the samples included in the list L(N) are classified, and when samples that are not classified with respect to all available angle ranges remain even after the measurement, the optical differential interrogation apparatus may classify the remaining samples with a separate list.

If only a refractive index affects a characteristic value of a sample in the above-described measurement, the optical differential interrogation apparatus for the surface plasmon resonance imaging may generate a list of samples having a small refractive index to a large refractive index using the same method described above.

Figure 7:
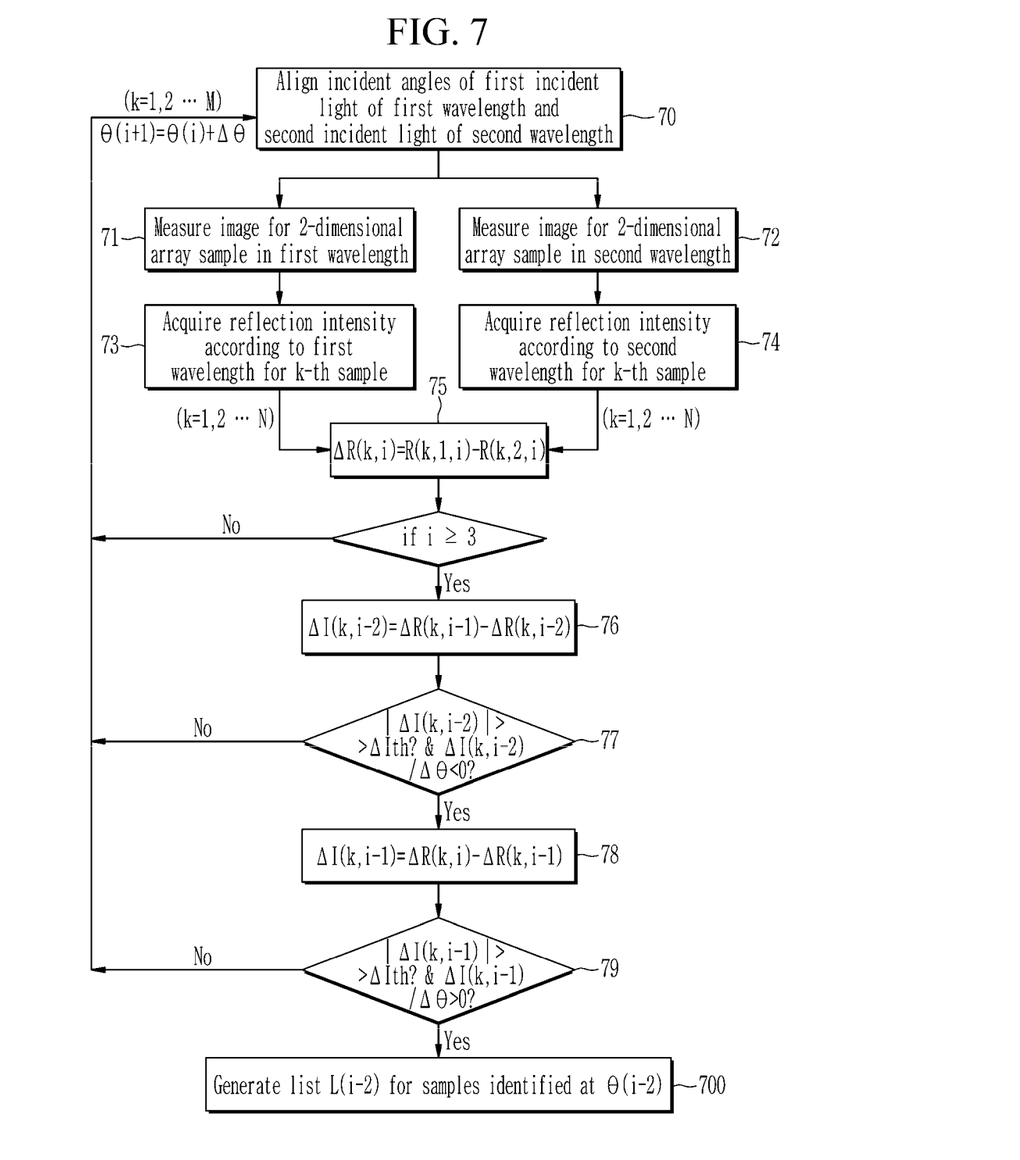
FIG. 7 is a flowchart of a two-wavelength SPRI-based angle scanning reflection intensity measurement method according to the exemplary embodiment of the present invention that was described with reference to FIG. 6.

FIG. 7 is a flowchart of a two-wavelength SPRI-based angle scanning reflection intensity measurement method according to the exemplary embodiment of the present invention that was described with reference to FIG. 6.

First, the optical differential interrogation apparatus for the surface plasmon resonance imaging aligns incident angles of first incident light of a first wavelength and second incident light of a second wavelength, in each of which a biosensor chip that includes a two-dimensional array sample is installed, to be θ(i), i=1, 2, . . . M (70).

The optical differential interrogation apparatus for the surface plasmon resonance imaging measures an image of the sensor chip of the first wavelength and an image of the sensor chip of the second wavelength (71 and 72).

The optical differential interrogation apparatus for the surface plasmon resonance imaging extracts reflection intensity R (k,1,i) and R (k,2,i) (here, k=1, 2, . . . , and N) from image data of a first wavelength I1 and a second wavelength I2 with respect to samples on the two-dimensional array (73 and 74).

The optical differential interrogation apparatus for the surface plasmon resonance imaging acquires a difference ΔR(k,i) between reflection intensity of two wavelengths with respect to the samples (k=1, 2, . . . , and N) at an incident angle θ(i) (75).

The optical differential interrogation apparatus for the surface plasmon resonance imaging carries out the above-described steps 70 to 75 until i is 3 or more.

When i is greater than 3, the optical differential interrogation apparatus for the surface plasmon resonance imaging obtains a characteristic value difference ΔI(k,i−2)=ΔR(k,i−1)−ΔR(k,i−2) by comparing all reflection intensities of two wavelengths with respect to the list L(N) of all the measured samples (k=1, 2, . . . N) while ΔR(k,i) is measured at an incident angle of 3 or more (76).

The optical differential interrogation apparatus for the surface plasmon resonance imaging identifies samples of which an absolute value of the characteristic value difference ΔI(k,i−2) is larger than the threshold value and a slope ΔI(k,i−2)/Δθ with respect to angles becomes a negative number through comparison (77).

The optical differential interrogation apparatus for the surface plasmon resonance imaging calculates a variation amount ΔI(k,i−1)=ΔR(k,i)−ΔR(k,i−1) of the characteristic value again (78).

The optical differential interrogation apparatus for the surface plasmon resonance imaging identifies samples of which an absolute value of the variation amount of the characteristic value is larger than ΔIth and a slope ΔI(k,i−2)/Δθ becomes a positive number (79).

The optical differential interrogation apparatus for the surface plasmon resonance imaging generates a list L(i−2) of the identified samples (700).

The optical differential interrogation apparatus for the surface plasmon resonance imaging compares a difference of the reflection intensity of two wavelengths measured at θ(i−2) with respect to the samples in the list L(i−2), and generates the list L(i−2) by aligning the samples according to magnitude of the reflection intensity.

The optical differential interrogation apparatus for the surface plasmon resonance imaging determines a list L(1) that includes samples having undergone the steps 70 to 700 in FIG. 7 from data measured at an incident angle of, i=1, 2, 3 with respect to the list L(N) that includes all samples in a two-dimensional array image.

The optical differential interrogation apparatus for the surface plasmon resonance imaging determines L(2) by adding data measured at an incident angle of i=4 with respect to other samples, which are not included in the list L(1), that is, L(N)-L(1).

The optical differential interrogation apparatus for the surface plasmon resonance imaging generates lists of L(i) with respect to all incident angles of i=1, 2, . . . M, and then all the samples, excluding the samples in L(N)-SL(i), are aligned in the order or the incident angle and the characteristic value, and thus it is possible to classify or distinguish the samples based on the lists.

Figure 8:
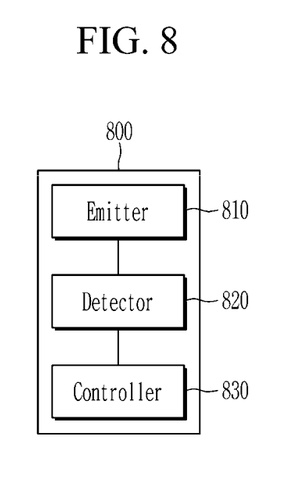
FIG. 8 shows an optical differential interrogation apparatus for the surface plasmon resonance imaging according to an exemplary embodiment of the present invention.

FIG. 8 shows an optical differential interrogation apparatus for the surface plasmon resonance imaging according to an exemplary embodiment of the present invention.

As shown in FIG. 8, an optical differential interrogation apparatus 800 for the surface plasmon resonance imaging according to an exemplary embodiment of the present invention includes an emitter 810 that emits first incident light and second incident light, a detector 820 that detects the first incident light and the second incident light emitted from the emitter 810, and a controller 830 that carries out differential interrogation based on the first incident light and the second incident light and analyzes samples.

According to the exemplary embodiments of the present invention, an SPR angle is interrogated in a linear section acquired from a reflection intensity difference between two wavelengths, and thus it is possible to obtain much better angular resolution while using a detector or a camera, which has a relative low receiving sensitivity.

In addition, according to the other exemplary embodiment of the present invention, the number of angles required for measurement can be minimized while measuring a wider dynamic range compared to a conventional case, and thus a sensor chip where samples having various characteristics are two-dimensionally arrayed and integrated can be effectively measured.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An optical differential interrogation method for surface plasmon resonance imaging, comprising:
letting first incident light of a first wavelength and second incident light of a second wavelength to be incident on a sample while varying an incident angle;
detecting intensity of first reflection light of the first incident light and intensity of second reflection light of the second incident light; and
identifying the sample by using a difference between the intensity of the first reflection light and the intensity of the second reflection light,
wherein the identifying of the sample by using the difference between the intensity of the first reflection light and the intensity of the second reflection light comprises:
detecting a first angle at which the difference between the intensity of the first reflection light and the intensity of the second reflection light becomes zero; and
identifying a sample that corresponds to the first angle.

2. The optical differential interrogation method of claim 1, wherein the identifying of the sample by using the difference between the intensity of the first reflection light and the intensity of the second reflection light comprises:

detecting a second angle at which the difference between the intensity of the first reflection light and the intensity of the second reflection light is a positive number, and a third angle at which the difference between the intensity of the first reflection light and the intensity of the second reflection light is a negative number; and
detecting the first angle based on the second angle and the third angle.

3. The optical differential interrogation method of claim 2, comprising:
differentiating intensity of the first reflection light and intensity of the second reflection light with respect to an angle;
identifying an eighth angle and a ninth angle at which a value of the differentiation is a negative number; and
detecting the first angle based on the eighth angle and the ninth angle.

4. The optical differential interrogation method of claim 1, wherein the identifying of the sample by using the difference between the intensity of the first reflection light and the intensity of the second reflection light comprises:
determining a magnitude of a difference between intensity of the first reflection light and intensity of the second reflection light at a fourth angle; and
identifying the sample based on the magnitude of the difference between the intensity of the first reflection light and the intensity of the second reflection light at the fourth angle.

5. The optical differential interrogation method of claim 4, comprising:
when the magnitude of the difference between the intensity of the first reflection light and the intensity of the second reflection light at the fourth angle is less than a threshold value, determining a fifth angle that is distanced by as much as a predetermined first gap from the fourth angle; and
when a difference between intensity of the first reflection light and intensity of the second reflection light that correspond to the fifth angle is zero, identifying a sample corresponding to the fifth angle.

6. The optical differential interrogation method of claim 4, comprising:
when the magnitude of the difference between the intensity of the first reflection light and the intensity of the second reflection light at the fourth angle is higher than the threshold and the difference between the intensity of the first reflection light and the intensity of the second reflection light at the fourth angle is a positive number, determining a sixth angle that is larger by a predetermined second gap than the fourth angle; and
when a difference between intensity of the first reflection light and intensity of the second reflection light at the sixth angle is zero, identifying a sample corresponding to the sixth angle.

7. The optical differential interrogation method of claim 6, wherein the first gap is larger than the second gap.

8. The optical differential interrogation method of claim 7, wherein the threshold value corresponds to a difference between the first incident light and the second incident light in a total reflection area with respect to the first incident light and the second incident light.

9. The optical differential interrogation method of claim 4, comprising:
when the magnitude of the difference between the intensity of the first reflection light and the intensity of the second reflection light at the fourth angle is higher than the threshold and the difference between the intensity of the first reflection light and the intensity of the second reflection light at the fourth angle is a negative number, determining a seventh angle that is smaller than the fourth angle by the predetermined second gap; and when a difference between intensity of the first reflection light and intensity of the second reflection light at the seventh angle is zero, identifying a sample corresponding to the seventh angle.

10. The optical differential interrogation method of claim 9, wherein the first gap is larger than the second gap.

11. An optical differential interrogation method for surface plasmon resonance imaging, comprising:
    letting a first incident light of a first wavelength and a second incident light of a second wavelength to be incident on a sample while varying an incident angle;
    detecting intensity of a first reflection light of the first incident light and intensity of a second reflection light of the second incident light; and
    identifying the sample by using a sum of the intensity of the first reflection light and the intensity of the second reflection light,
    wherein identifying the sample by using the sum of the intensity of the first reflection light and the intensity of the second reflection light comprises:
        detecting an angle at which the sum of the intensity of the first reflection light and the intensity of the second reflection light has a minimum value; and
        identifying a sample that corresponds to the detected angle.

12. The optical differential interrogation method of claim 11, wherein a gap between the first wavelength and the second wavelength is larger than a first full width at half maximum of a wavelength range of the first incident light and a second full width at half maximum of a wavelength range of the second incident light.

13. The optical differential interrogation method of claim 11, wherein the letting the first incident light of the first wavelength and the second incident light of the second wavelength to be incident on the sample while varying the incident angle comprises letting the first incident light and the second incident light to be incident by using a wavelength tunable light source.

14. The optical differential interrogation method of claim 11, wherein the letting the first incident light of the first wavelength and the second incident light of the second wavelength to be incident on the sample while varying the incident angle comprises:
    coupling the first incident light and the second incident light from different light sources by using an optical fiber coupler; and
    letting the coupled first incident light and the second incident light to be incident on a sample through a single optical fiber.

15. The optical differential interrogation method of claim 11, wherein the letting the first incident light of the first wavelength and the second incident light of the second wavelength to be incident on the sample while varying the incident angle comprises letting the first incident light and the second incident light from different light sources to be overlapped with each other on the same path by using a multiple wavelength coupling filter.

16. The optical differential interrogation method of claim 11, wherein, in the detecting the intensity of the first reflection light of the first incident light and the intensity of the second reflection light of the second incident light, the first reflection light and the second reflection light are branched by a wavelength distributor and thus are detected by different detectors or different cameras.

17. The optical differential interrogation of claim 16, wherein the letting the first incident light of the first wavelength and the second incident light of the second wavelength to be incident on the sample while varying the incident angle comprises letting the first incident light and the second incident light to be sequentially incident on the sample with a time difference corresponding to a detection speed of the detector or camera.

18. An optical differential interrogation method for surface plasmon resonance imaging, comprising:
    letting first incident light of a first wavelength and second incident light of a second wavelength to be incident on a sample while varying an incident angle;
    detecting intensity of first reflection light of the first incident light and intensity of second reflection light of the second incident light; and
    identifying the sample by using a difference between the intensity of the first reflection light and the intensity of the second reflection light,
    wherein the identifying of the sample by using the difference between the intensity of the first reflection light and the intensity of the second reflection light comprises:
        determining a magnitude of a difference between intensity of the first reflection light and intensity of the second reflection light at a given angle; and
        identifying the sample based on the magnitude of the difference between the intensity of the first reflection light and the intensity of the second reflection light at the angle.

* * * * *